United States Patent
Hutchinson et al.

(10) Patent No.: US 9,842,618 B1
(45) Date of Patent: Dec. 12, 2017

(54) COMBINED WRITE/ACTIVE FLY CONTROL FOR HEAT ASSISTED MAGNETIC RECORDING IN A READER OVER WRITER APPLICATION

(71) Applicant: Seagate Technology LLC, Cupertino, CA (US)

(72) Inventors: Erik J. Hutchinson, Eden Prairie, MN (US); John Wolf, Maple Grove, MN (US); Todd Michael Lammers, Lafayette, CO (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/205,224

(22) Filed: Jul. 8, 2016

(51) Int. Cl.
*G11B 5/60* (2006.01)
*G11B 5/48* (2006.01)
*G11B 5/00* (2006.01)

(52) U.S. Cl.
CPC ............ *G11B 5/607* (2013.01); *G11B 5/4853* (2013.01); *G11B 5/6088* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,822,153 A * | 10/1998 | Lairson | B82Y 10/00 360/234.7 |
| 7,006,336 B2 | 2/2006 | Coffey et al. | |
| 7,023,660 B2 | 4/2006 | Hsiao et al. | |
| 7,589,936 B1 * | 9/2009 | McFadyen | G11B 5/17 360/123.1 |
| 7,990,647 B2 * | 8/2011 | Lille | G11B 5/314 360/59 |
| 8,094,418 B2 * | 1/2012 | Schreck | B82Y 10/00 360/125.31 |
| 8,259,412 B2 * | 9/2012 | Hsiao | G11B 5/3133 360/125.31 |
| 8,310,782 B2 * | 11/2012 | Song | G11B 5/1278 360/121 |
| 8,576,671 B1 * | 11/2013 | Cha | G11B 5/3133 360/125.31 |
| 8,582,242 B2 * | 11/2013 | Sonda | G11B 5/3106 360/125.3 |
| 8,634,167 B2 * | 1/2014 | Hsiao | G11B 5/3133 360/125.31 |
| 8,730,608 B1 | 5/2014 | Van Eaton et al. | |

(Continued)

*Primary Examiner* — Will J Klimowicz
(74) *Attorney, Agent, or Firm* — Hollingsworth Davis, LLC (57) ABSTRACT

An apparatus includes a slider of a heat-assisted magnetic recording head. The slider comprises an air bearing surface, a substrate, and a plurality of electrical bond pads coupled to bias sources. A writer is positioned proximate the substrate. The writer comprises write coils coupled between first and second bond pads. At least one heater is coupled between the first and second bond pads. The at least one heater is disposed within the writer and is configured to thermally actuate the air bearing surface of the writer. A reader is disposed on the slider such that the writer is between the substrate and the reader. Write induced protrusion of the air bearing surface of the writer is moderated by stiffness of the substrate proximate the writer.

20 Claims, 10 Drawing Sheets

(56) References Cited

U.S. PATENT DOCUMENTS

| | | | |
|---|---|---|---|
| 8,929,016 B2 | 1/2015 | Gao et al. | |
| 8,953,275 B2* | 2/2015 | Chou | G11B 5/6076 360/31 |
| 9,013,820 B1* | 4/2015 | Camalig | G11B 20/10009 360/46 |
| 9,058,829 B1* | 6/2015 | Wolf | G11B 5/6064 |
| 9,202,490 B2* | 12/2015 | Zuckerman | G11B 5/4866 |
| 9,208,811 B1* | 12/2015 | Kim | G11B 5/607 |
| 9,251,829 B2* | 2/2016 | Ngan | G11B 5/607 |
| 9,472,224 B2* | 10/2016 | Macken | G11B 5/607 |
| 9,502,064 B1* | 11/2016 | Macken | G11B 5/6035 |
| 9,607,641 B1* | 3/2017 | Ramakrishnan | G11B 5/6005 |
| 2005/0018347 A1* | 1/2005 | Hsiao | G11B 5/012 360/128 |
| 2007/0236836 A1* | 10/2007 | Kurita | G11B 5/3133 360/234.7 |
| 2010/0103783 A1* | 4/2010 | Gill | G11B 5/1278 369/13.14 |
| 2012/0092789 A1* | 4/2012 | Hsiao | G11B 5/607 360/59 |
| 2012/0218662 A1* | 8/2012 | Sasaki | G11B 5/1278 360/123.12 |
| 2014/0029397 A1* | 1/2014 | Rausch | B65D 75/563 369/13.24 |
| 2014/0146647 A1* | 5/2014 | Andruet | G11B 17/32 369/13.17 |
| 2015/0103430 A1* | 4/2015 | Gadbois | G11B 5/4853 360/59 |
| 2015/0325258 A1* | 11/2015 | Lam | G11B 5/3116 360/235.4 |

* cited by examiner

COMBINED WRITE/ACTIVE FLY CONTROL FOR HEAT ASSISTED MAGNETIC RECORDING IN A READER OVER WRITER APPLICATION

SUMMARY

Various embodiments involve an apparatus comprising a slider of a heat-assisted magnetic recording head. The slider comprises an air bearing surface, a substrate, and a plurality of electrical bond pads coupled to bias sources. A writer is positioned proximate the substrate. The writer comprises write coils coupled between first and second bond pads. At least one heater is coupled between the first and second bond pads. The at least one heater is disposed within the writer and is configured to thermally actuate the air bearing surface of the writer. A reader is disposed on the slider such that the writer is between the substrate and the reader. Write induced protrusion of the air bearing surface of the writer is moderated by stiffness of the substrate proximate the writer.

Various embodiments involve an apparatus comprising a slider of a heat-assisted magnetic recording head. The slider comprises an air bearing surface, a substrate, and a plurality of electrical bond pads coupled to bias sources. A writer is proximate the substrate. The writer comprises write coils coupled between first and second bond pads. At least two heaters are coupled between the first and second bond pads. At least one of the at least two heaters is disposed within the writer and configured to thermally actuate the air bearing surface of the writer. A reader is disposed on the slider such that the writer is between the substrate and the reader. Write induced protrusion of the air bearing surface of the writer is moderated by stiffness of the substrate proximate the writer.

The above summary is not intended to describe each disclosed embodiment or every implementation of the present disclosure. The figures and the detailed description below more particularly exemplify illustrative embodiments.

BRIEF DESCRIPTION OF THE DRAWINGS

Throughout the specification reference is made to the appended drawings, where like reference numerals designate like elements, and wherein.

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure is generally directed to read-write heads used in magnetic recording devices such as hard drives. In particular, this disclosure relates to heat-assisted magnetic recording (HAMR), which can be used to increase areal data density of magnetic media. HAMR may also be referred to as energy-assisted magnetic recording (EAMR), thermally-assisted magnetic recording (TAMR), and thermally-assisted recording (TAR). In a HAMR device, information bits are recorded in a storage layer at elevated temperatures in a specially configured magnetic media. The use of heat can overcome superparamagnetic effects that might otherwise limit the areal data density of the media. As such, HAMR devices may include magnetic write heads for delivering electromagnetic energy to heat a small confined media area (spot size) at the same time the magnetic write head applies a magnetic field to the media for recording.

A HAMR read/write element, sometimes referred to as a slider, recording head, read head, write head, read/write head, etc., includes magnetic read and write transducers similar to those on current hard drives. For example, data may be read by a magnetoresistive sensor that detects magnetic fluctuations of a magnetic media as it moves underneath the sensor. Data is written to the magnetic media by a write coil that is magnetically coupled to a write pole. The write pole changes magnetic orientation in regions of the media as it moves underneath the write pole in response to an energizing current applied to the write coil. A HAMR slider will also generally include a source of energy, such as a laser diode, to heat the media while it is being written to by the write pole. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This results in a high temperature rise in a small region on the media, with the region exceeding the Curie temperature having dimensions less than 100 nm.

Figure 1:
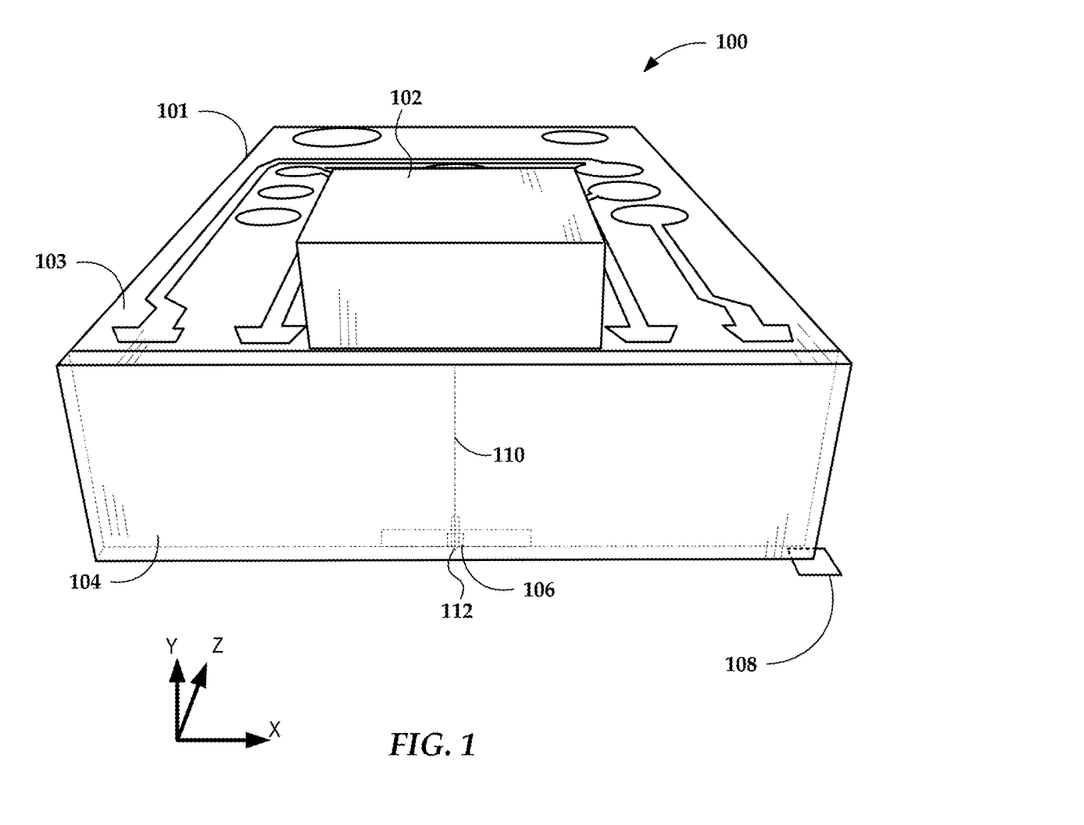
FIG. 1 is a perspective view of a hard drive slider that includes a waveguide in accordance with embodiments described herein.

In reference to FIG. 1, a perspective view shows a HAMR slider assembly 100 according to an example embodiment. The slider assembly 100 includes a laser diode 102 located on input surface 103 of a slider body 101. In this example, the input surface 103 is a top surface, which is located opposite to a media-facing surface 108 that is positioned over a surface of a recording media (not shown) during device operation. The media-facing surface 108 faces and is held proximate to the moving media surface while reading and writing to the media. The media-facing surface 108 may be configured as an air-bearing surface (ABS) that maintains separation from the media surface via a thin layer of air.

The laser diode 102 delivers light to a region proximate a HAMR read/write head 106, which is located near the media-facing surface 108. The energy is used to heat the recording media as it passes by the read/write head 106. Optical coupling components, are formed integrally within the slider body 101 (near a trailing edge surface 104 in this example) and function as an optical path that delivers energy from the laser diode 102 to the recording media via a near-field transducer 112. The near-field transducer 112 is near the read/write head 106 and causes heating of the media during recording operations.

The laser diode 102 in this example may be configured as either an edge-emitting laser or surface-emitting laser. Generally, the edge-emitting laser emits light from near a corner edge of the laser and a surface emitting laser emits light in a direction perpendicular to a surface of the laser body, e.g., from a point near a center of the surface. An edge-emitting laser may be mounted on the top surface 103 of the slider body 101 (e.g., in a pocket or cavity) such that the light is emitted in a direction parallel to (or at least non-perpendicular to) the media-facing surface. A surface-emitting or edge-emitting laser in any of these examples may be directly coupled to the slider body 101, or via an intermediary component such as a submount (not shown). A submount can be used to orient an edge-emitting laser so that its output is directly downwards (negative y-direction in the figure).

While the example in FIG. 1 shows a laser diode 102 directly mounted to the slider body 101, the waveguide system 110 discussed herein may be applicable to any type of light delivery configuration. For example, a laser may be mounted on the trailing edge surface 104 instead of the top surface 103. In another configuration known as free-space light delivery, a laser may be mounted external to the slider 100, and coupled to the slider by way of optic fiber and/or waveguide. An input surface of the slider body 101 may include a grating or other coupling feature to receive light from the laser via the optic fiber and/or waveguide.

Figure 2:
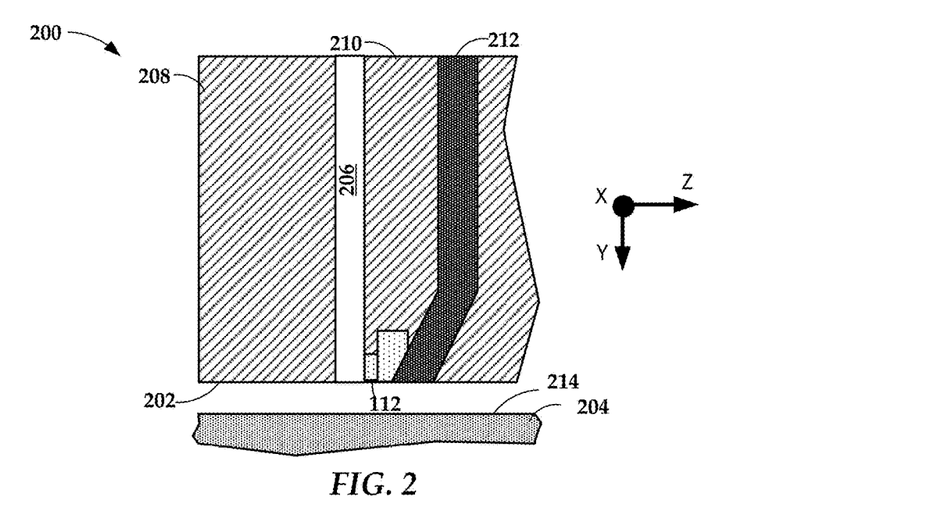
FIG. 2 is a cross-sectional view shows details of a HAMR apparatus according to various implementations.

In reference now to FIG. 2, a cross-sectional view shows details of a HAMR apparatus 200 according to an example embodiment. Near-field transducer 112 is located proximate a media-facing surface 202 (e.g., ABS), which is held near a magnetic recording media 204 during device operation. In the orientation of FIG. 2, the media-facing surface 202 is arranged parallel to the x-z plane. A waveguide core 206 may be disposed proximate the NFT 112, which is located at or near the media writing surface 214.

The waveguide core 206 surrounded by cladding layers 208, 210. The waveguide core 206 and cladding layers 208, 210 may be made from dielectric materials such as $Al_2O_3$, $SiO_xN_y$, $SiO_2$, $Ta_2O_5$, $TiO_2$, ZnS, $SiN_x$, $Nb_2O_5$, AlN, $Hf_2O_3$, $Y_2O_3$, AlO, etc. Generally, the dielectric materials are selected so that the refractive index of the waveguide core layer 206 is higher than refractive indices of the cladding layers 208, 210. This arrangement of materials facilitates efficient propagation of light through the waveguide. Light is delivered from the waveguide core 206 along the negative y-direction where it is coupled to the NFT 112. The NFT 112 delivers surface plasmon enhanced, near-field electromagnetic energy along the y-axis where it exits at the media writing surface 214. This may result in a highly localized hot spot (not shown) on the media surface 214 when the media 204 placed in close proximity to surface 202 of the apparatus 200. Further illustrated in FIG. 2 is a recording pole 212 of the read/write head that is located alongside the NFT 112. The recording pole 212 generates a magnetic field (e.g., perpendicular field) used in changing the magnetic orientation of the hotspot during writing.

In addition to convention components, A HAMR head incorporates various optical components and sensors that require power supplied by the set of bond pads made available at the transducer. The increase in the number and type of components and sensors of a HAMR head significantly complicates the electrical bond pad connection and powering strategy for a particular HAMR head design. The ability to limit or reduce the number of bond pads can help to reduce the size of the transducer.

Figure 3:
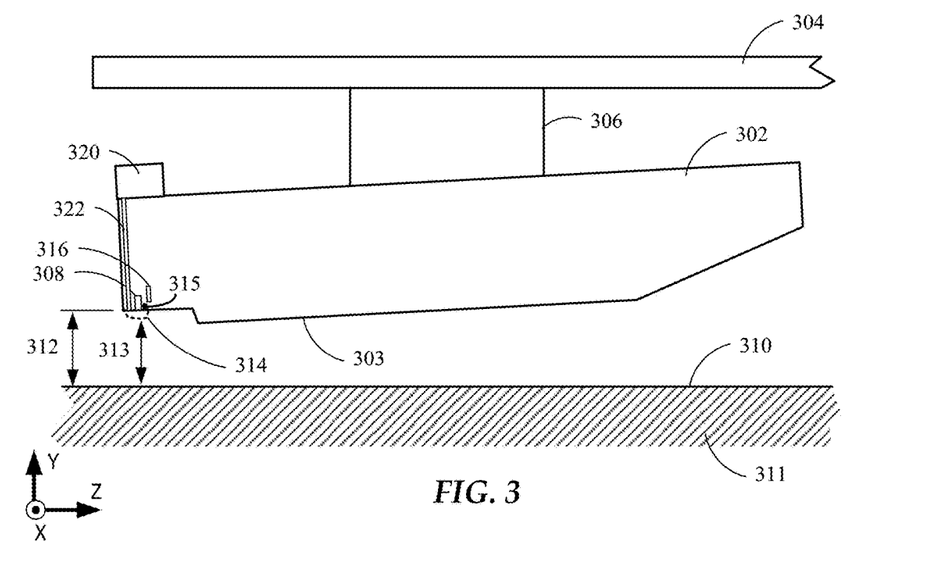
FIG. 3 illustrates a hard drive slider in accordance with some aspects described herein.

FIG. 3 shows a side view of a read/write transducer 302 configured for heat-assisted magnetic recording according to a representative embodiment. The read/write transducer 302 may be used in a magnetic data storage device, e.g., a hard disk drive. The read/write transducer 302 may also be referred to herein as a slider, read head, recording head, etc. The read/write transducer 302 is coupled to an arm 304 by way of a suspension 306 that allows some relative motion between the read/write transducer 302 and arm 304. The read/write transducer 302 includes read/write transducers 308 at a trailing edge that are held proximate to a surface 310 of a magnetic recording medium 311, e.g., magnetic disk. The read/write transducer 302 further includes a laser 320 and a waveguide 322. The waveguide 322 delivers light from the laser 320 to components (e.g., a near-field transducer) near the read/write transducers 308.

When the read/write transducer 302 is located over surface 310 of recording medium 311, a flying height 312 is maintained between the read/write transducer 302 and the surface 310 by a downward force of arm 304. This downward force is counterbalanced by an air cushion that exists between the surface 310 and an air bearing surface 303 (also referred to herein as a "media-facing surface") of the read/write transducer 302 when the recording medium 311 is rotating. It is desirable to maintain a predetermined slider flying height 312 over a range of disk rotational speeds during both reading and writing operations to ensure consistent performance. Region 314 is a "close point" of the read/write transducer 302, which is generally understood to be the closest spacing between the read/write transducers 308 and the magnetic recording medium 311, and generally defines the head-to-medium spacing 313.

To account for both static and dynamic variations that may affect slider flying height 312, the read/write transducer 302 may be configured such that a region 314 of the read/write transducer 302 can be configurably adjusted during operation in order to finely adjust the head-to-medium spacing 313. This is shown in FIG. 3 by a dotted line that represents a change in geometry of the region 314. In this example, the geometry change may be induced, in whole or in part, by an increase or decrease in temperature of the region 314 via one or more heaters 316. A thermal sensor 315 is shown situated at or near the close point 314 (e.g., adjacent the read/write transducers 308, such as near the near-field transducer) or can be positioned at other location of the ABS 303.

According to various embodiments, the writer of a magnetic recording head includes a corresponding heater, and the reader of the recording head includes a corresponding heater. The writer heater can be powered to cause protrusion of the ABS predominantly in the ABS region at or proximate the writer and the reader heater can be powered to cause protrusion of the ABS predominately in the ABS region at or proximate the reader. Power may be delivered independently to the writer heater and to the reader heaters to adjust the fly height (e.g., clearance) of the slider relative to the surface of the recording medium. One or more thermal sensors may also be situated at various locations (e.g., close points) on the slider at or near the ABS for purposes of monitoring temperature, head-medium spacing changes, and head-medium contact.

According to various implementations, one or more heaters are placed in series and/or parallel with the write coils. The one or more heaters are configured to thermally actuate the air bearing surface of the writer such that the write induced protrusion of the air bearing surface of the writer is moderated by stiffness of the substrate proximate the writer. Placing heaters in a series or parallel circuit with the write coils may have the effect of increasing the resistance of the write coils. An increased resistance in the write coils can cause higher heat generated by the circuit. In some cases, one or more heaters may be located proximate the reader structure.

Figure 4A:
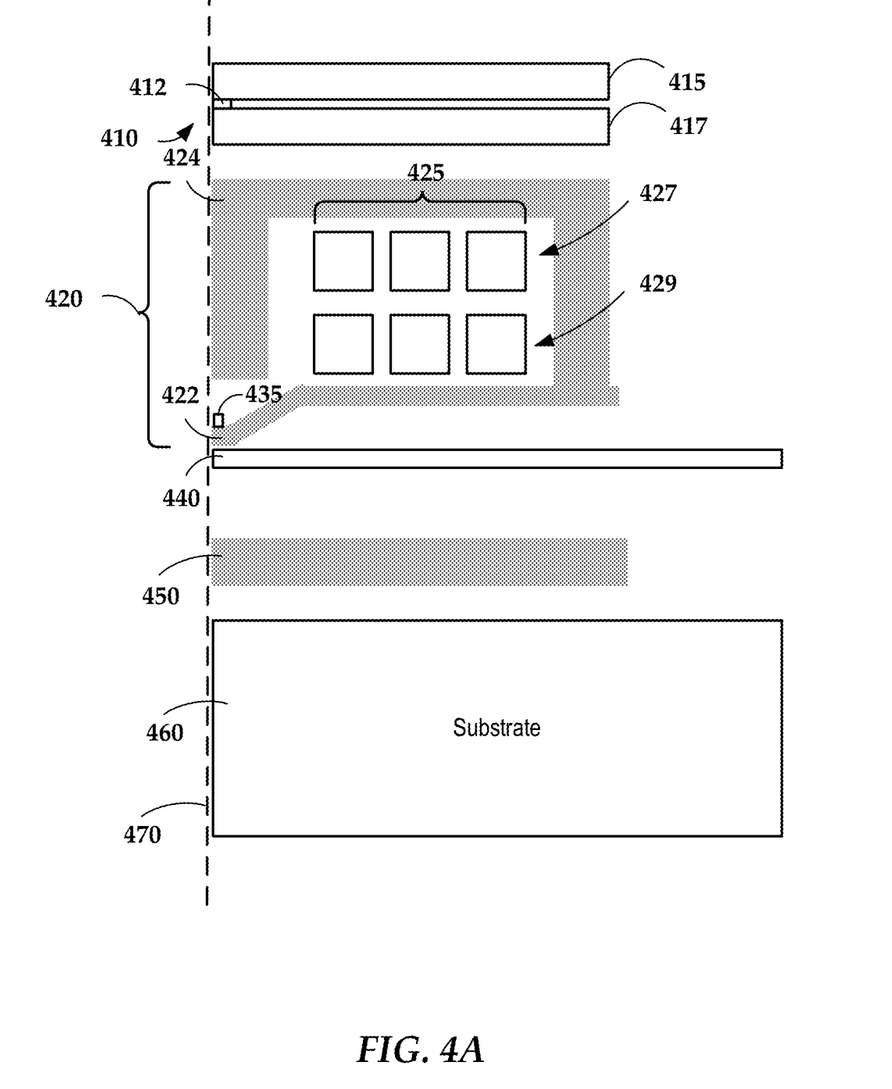
FIGS. 4A-4E show example placements for heaters in accordance with some implementations.

FIG. 4A illustrates a portion of a slider having a reader over writer configuration in accordance with various embodiments described herein. The portion of the slider shown in FIG. 4A includes a substrate 460 over which several slider components are situated. The substrate 460 can comprise various materials such as AlTiC, for example. The slider includes an air bearing surface 470, which is indicated by the dashed line. A number of components are shown at or near the ABS 470. The slider includes a reader 410 comprising a reader element 412 disposed between a pair of reader shields 415 and 417. A writer 420 includes a write coil arrangement 425 that, when energized, induces magnetic flux through the write pole 422 and return poles 424, 450.

In some embodiments, the slider is configured for heat-assisted magnetic recording. In other embodiments, the slider is configured for conventional magnetic recording (i.e., not configured for HAMR). In the embodiment illustrated in FIG. 4, the slider is implemented for HAMR and is shown to include a near-field transducer 435 situated proximate the write pole 422 of the writer 420. A heat sink may be disposed between the NFT 435 and the write pole 422. A HAMR slider may include an optical waveguide 440, such as a planar or channel waveguide, extending through the slider body and optically coupled to the NFT 435 and a light source, such as a laser diode. It is understood that for embodiments not configured for HAMR, the slider would exclude the NFT 435, optical waveguide 440, and other optical components associated with a HAMR slider configuration.

As described above, the writer 420 is shown to include a write coil arrangement 425. In the embodiment shown in FIG. 4A, the write coil arrangement 425 includes an upper layer 427 and a lower layer 429. The write coil arrangement 425 may conform to any writer coil design, including a single-layer pancake design or a helical coil design, for example.

As described above, HAMR recording uses media that has high coercivity and a plasmonic event is used to enable the transducer to write to the disk. Thus, the write coils alone can be activated without magnetically writing to the disk. In a writer over reader configuration, activating the write coils may produce a significant protrusion event and prevent the transducer from actively flying in a low clearance environment. In a reader over writer configuration as shown in FIGS. 4A-4E, the substrate's natural stiffness may prevent or moderate a protrusion event and still allow the transducer to fly at a low clearance upon activation of the write coils.

According to various implementations, the reader is the close point of the transducer when a writer heater is off. When the writer heater switches on, the writer becomes the close point of the transducer. According to various implementations, the writer becomes the close point when the laser turns on. The reader remains the close point until the laser is turned on at or above an activation current and/or the write heater is turned on. If the laser is below the activation current or the write heaters are turned off, the reader remains the close point until the laser current increases to a level at or above the activation current.

Figure 4B:
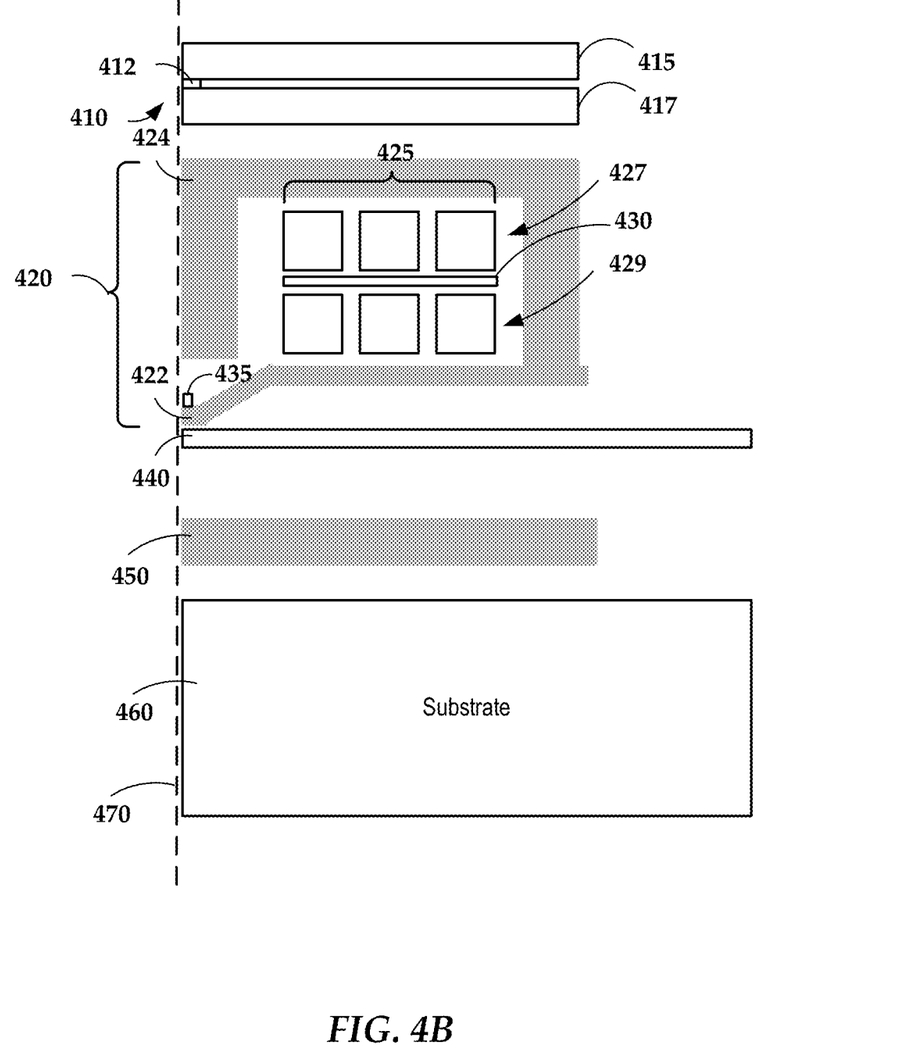
Figure 4C:
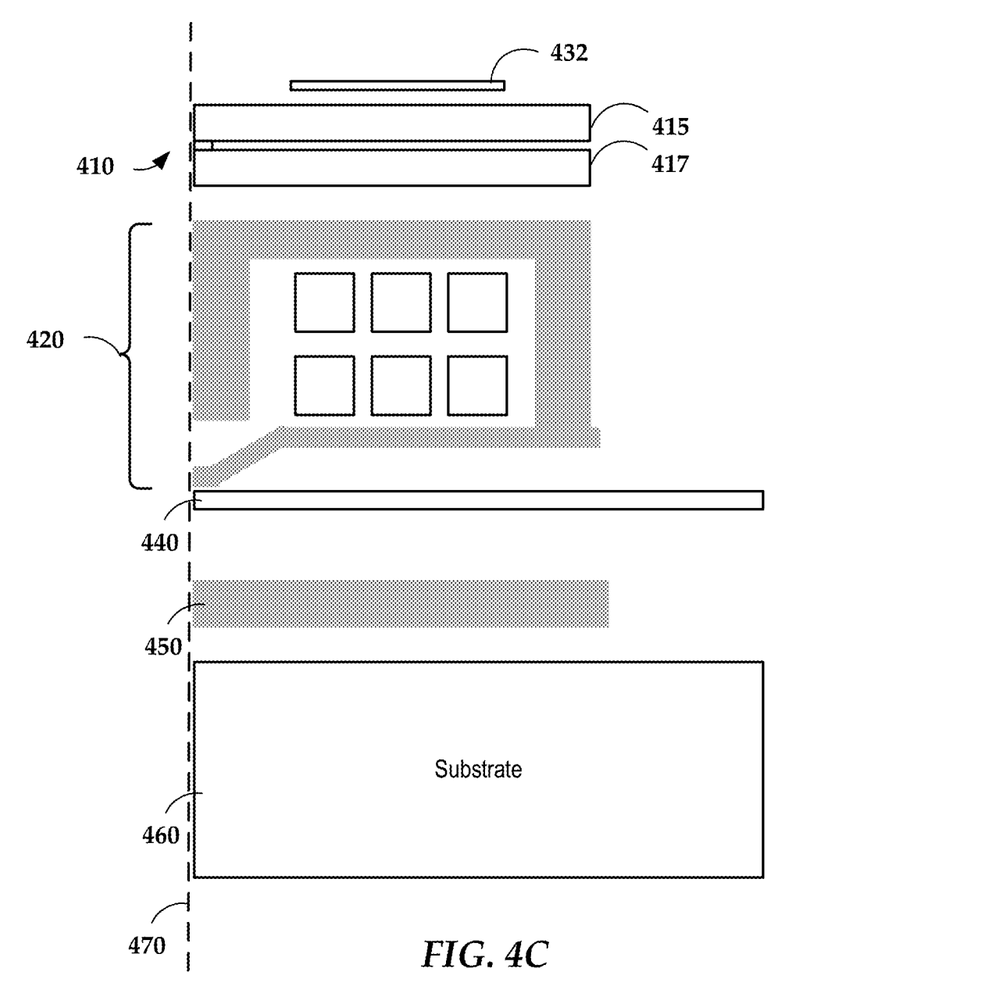
Figure 4D:
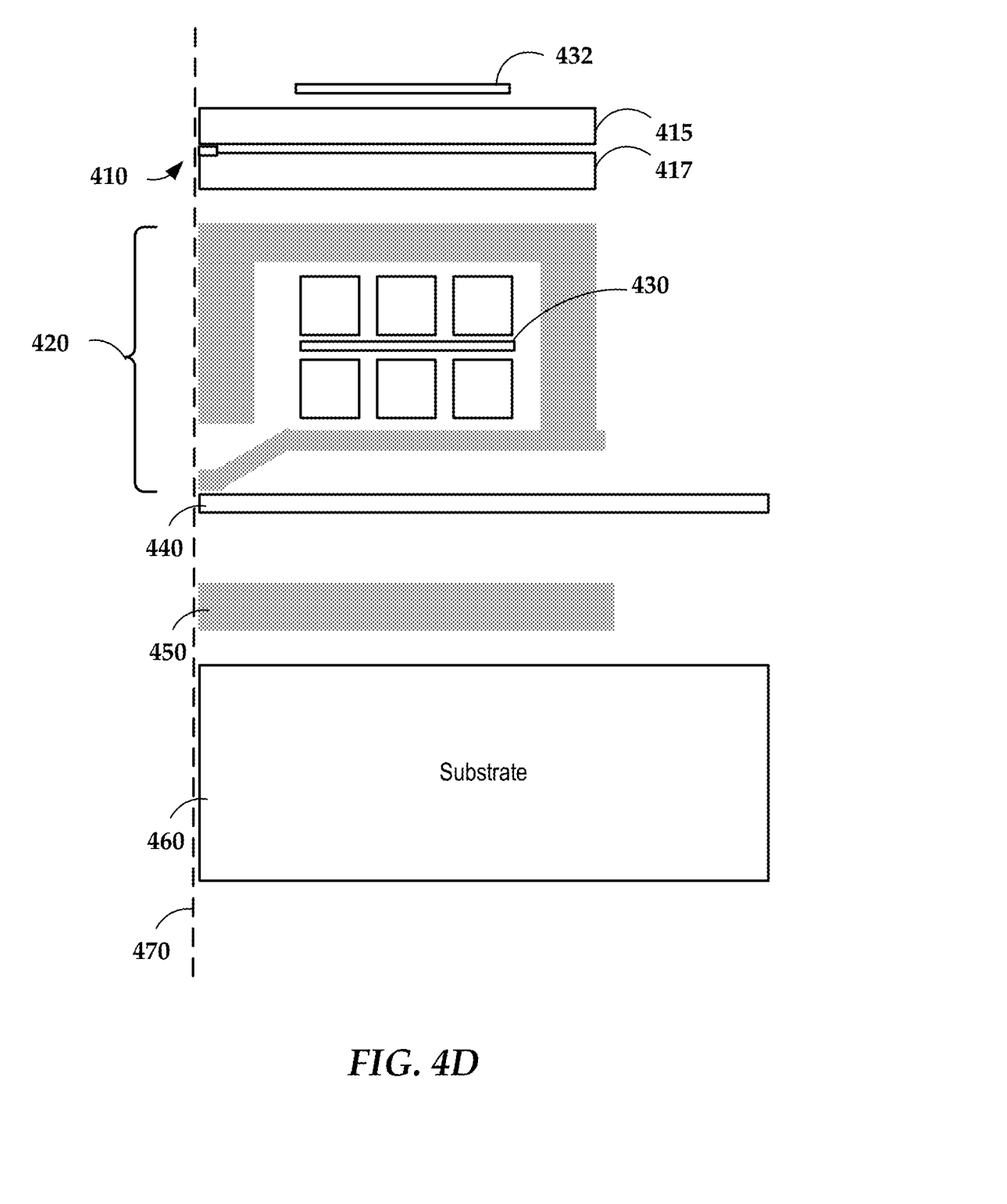
Figure 4E:
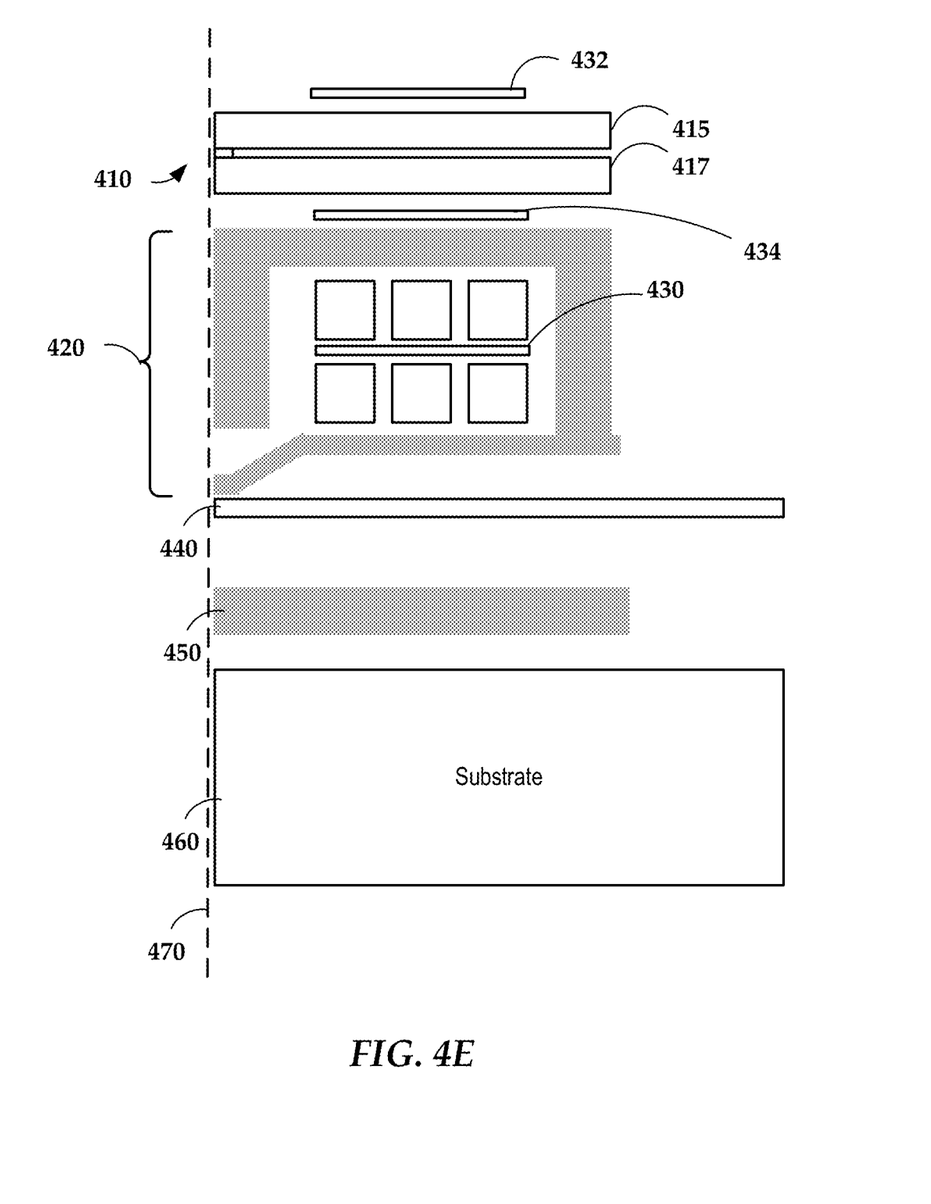

FIGS. 4B-4E illustrate a portion of the slider having example heater placements in a reader over writer configuration in accordance with embodiments described herein. FIG. 4B shows a heater 430 positioned between the two write coil layers 427, 429. FIGS. 4C and 4D illustrate a second heater placement 432 that may be used as an alternative to the first heater placement 430 as shown in FIG. 4C or in addition to the first heater placement 430 as illustrated in FIG. 4D. The second heater placement 432 is located proximate to the first reader shield 415 on a side of the reader 410 away from the writer 420. FIG. 4E shows a third heater placement 434. The third heater placement 434 is located proximate to the second reader shield 417 on a side of the reader 410 proximate the writer 420. It is to be understood that while FIG. 4E illustrates a heater at each of the first, second, and third heater placements, the system may include any combination of heater placement locations and may have any number of heaters.

In some cases, in all of the configurations shown in FIGS. 4B-4E, the write coils and the heater(s) are placed in an electrical series or parallel circuit. In the configuration of FIG. 4B, the write coils and heater are placed close to the transducer's magnetic write pole as shown. The configurations having a heater at the second or third heater placement location have a heater pathway that is closer to the transducer's reader but is still in series or parallel with the write coil arrangement.

In cases where the heater is placed near the write coil arrangement, large protrusions may occur. By placing the writer closer to the substrate, write induced protrusion can be more easily controlled because the substrate has a high Young's Modulus (natural stiffness). Adding two or more heating elements would allow the reader to be functional as well during operation. The position of the write and read elements during active fly operation would be controlled by the materials used (i.e. their physical properties) and the design and shape of the heating elements in series with the write coils.

Figure 5A:
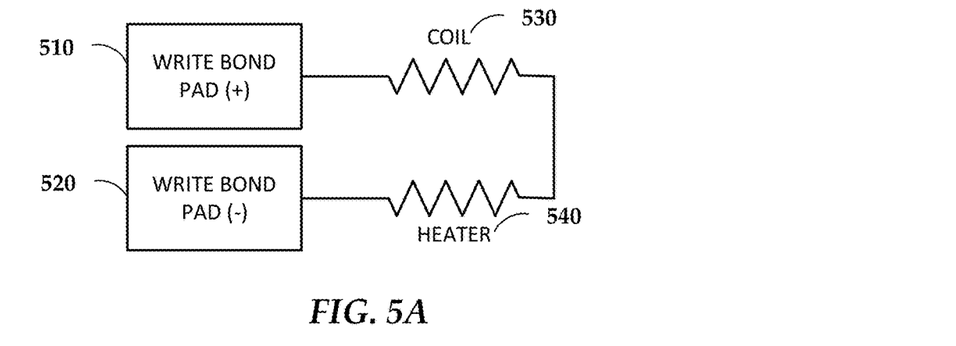
FIGS. 5A-5F illustrate circuit diagrams for various heater placements in accordance with various embodiments.
Figure 5B:
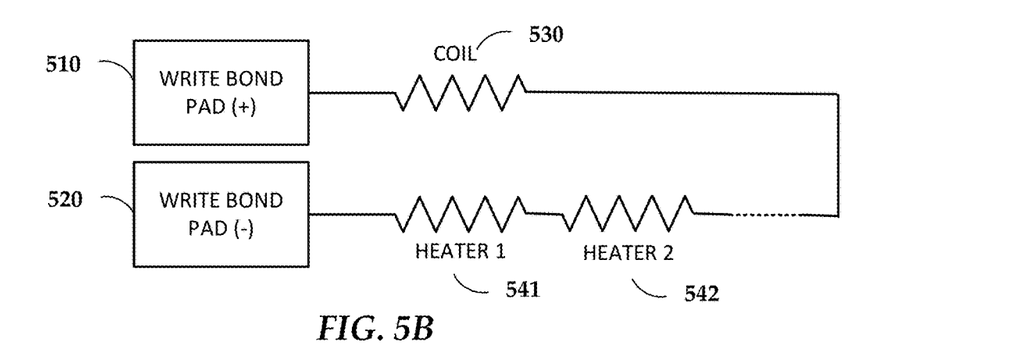

FIGS. 5A-5F illustrate circuit diagrams for various heater configurations in accordance with various embodiments described herein. FIG. 5A shows a heater 540 in series with the write coil 530 and with a first bond pad 510 and a second bond pad 520. In some cases, more than one heater is disposed in series with the write coils as shown in FIG. 5B. In FIG. 5B a first heater 541 and a second heater 542 are connected in series with the write coil 530. Optionally, more than two heaters may be connected in series with the write coil.

Figure 5C:
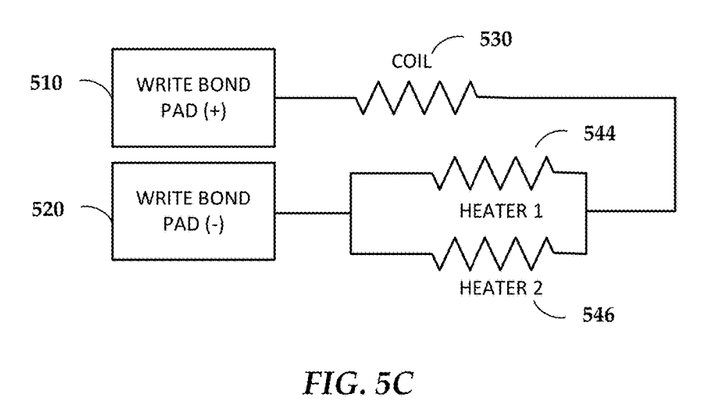
Figure 5D:
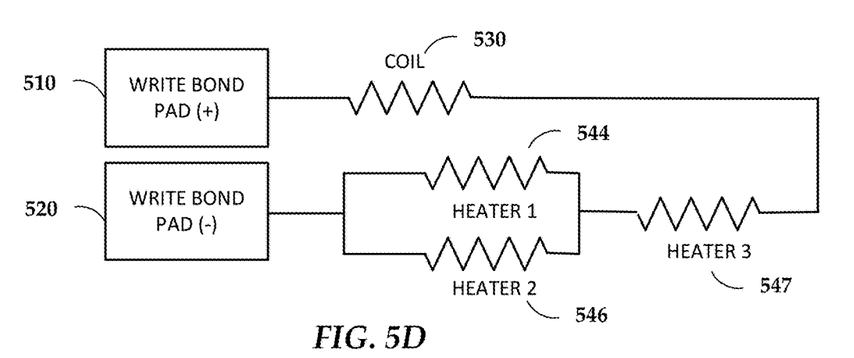
Figure 5E:
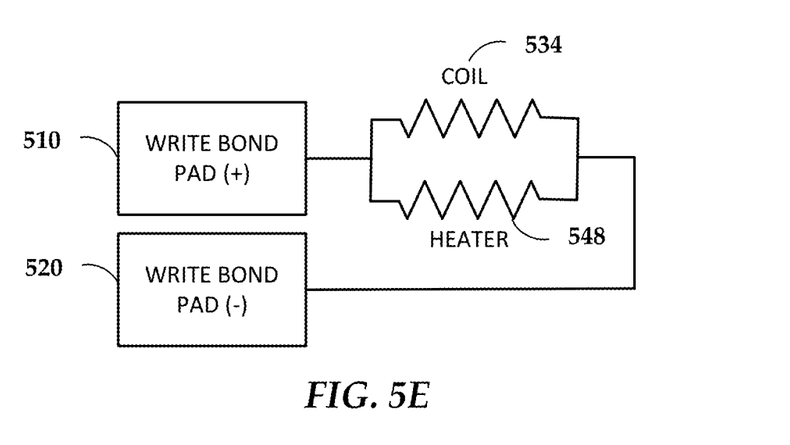
Figure 5F:
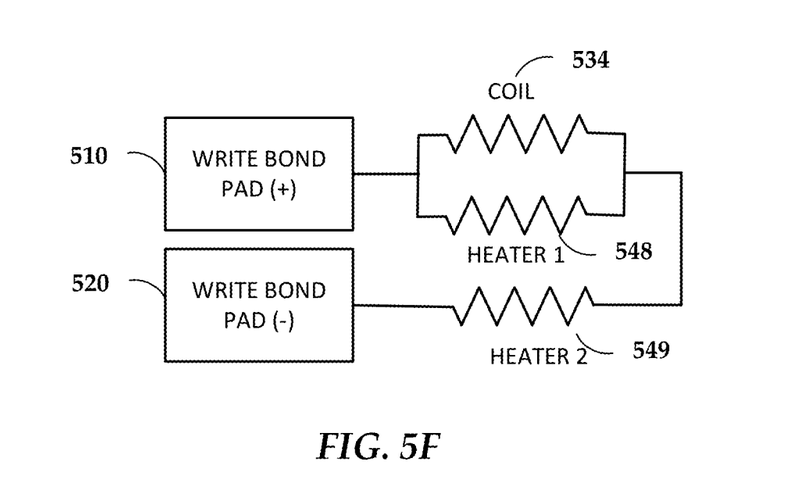

In some cases, in configurations in which one or more heaters are in series with the write coils, the additional resistance that is added to the write path may involve an increased preamplifier steady state voltage launch to maintain a predetermined current to the write coil. In order to alleviate potential preamplifier limitations in maintaining a higher steady state voltage, two or more heating elements may be placed in a parallel electrical circuit that is also in series with the write coil. In this configuration, the overall resistance will be reduced and thus the preamplifier steady state voltage may not have to be increased as much as in a case in which two or more heaters are in series with the write coil. FIG. 5C illustrates an embodiment in which two parallel heaters 544, 546 are placed in series with the write coil 530. In some cases, more than two heaters are placed in parallel. A third heater 547 may also be placed in series with the parallel heaters as shown in FIG. 5D. FIG. 5E shows an example in which at least one heater 548 is placed in parallel with the write coil 534. A second heater 549 may also be placed in series with the parallel-connected write coil 534 and heater 548 as illustrated by FIG. 5F.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. An apparatus, comprising:
   a slider of a heat-assisted magnetic recording head comprising an air bearing surface, a substrate, and a plurality of electrical bond pads coupled to bias sources;
   a writer proximate the substrate, the writer comprising write coils coupled between first and second bond pads;
   at least one heater coupled between the first and second bond pads, the at least one heater disposed within the writer and configured to thermally actuate the air bearing surface of the writer; and
   a reader disposed on the slider such that the writer is between the substrate and the reader;
   wherein write induced protrusion of the air bearing surface of the writer is moderated by stiffness of the substrate proximate the writer.

2. The apparatus of claim 1, wherein the at least one heater is coupled in series with the write coil.

3. The apparatus of claim 1, wherein the at least one heater is coupled in parallel with the write coil.

4. The apparatus of claim 1, wherein the at least one heater is disposed between the write coils of the writer.

5. The apparatus of claim 1, wherein:
   at least two heaters are coupled between the first and second bond pads;
   a first heater is disposed within the writer; and
   a second heater is disposed proximate the reader.

6. The apparatus of claim 5, wherein:
   the first and second heaters are coupled in parallel; and
   the parallel-coupled first and second heaters are coupled in series with write coil.

7. The apparatus of claim 1, wherein:
   at least three heaters are coupled between the first and second bond pads;
   a first heater is disposed within the writer; and
   a second heater and a third heater are disposed proximate the reader.

8. The apparatus of claim 1, wherein a first heater is coupled in parallel with the write coil and a second heater is coupled in series with the parallel coupled write coil and the first heater.

9. The apparatus of claim 1, further comprising an input coupler configured to receive light from a light source, wherein the reader is closer than the writer to a magnetic medium if the light source is turned off and the writer is closer than the reader to the magnetic medium when the light source is turned on.

10. The apparatus of claim 1, further comprising an input coupler configured to receive light from a light source, wherein the reader is closer than the writer to a magnetic medium if the light source is turned off or the light source is turned on at a current below a predetermined activation current, and the writer is closer than the reader to the magnetic medium when the light source is turned on at a current at or above the predetermined activation current.

11. An apparatus, comprising:
    a slider of a heat-assisted magnetic recording head comprising an air bearing surface, a substrate, and a plurality of electrical bond pads coupled to bias sources;
    a writer proximate the substrate, the writer comprising write coils coupled between first and second bond pads;
    at least two heaters coupled between the first and second bond pads, at least one of the at least two heaters disposed within the writer and configured to thermally actuate the air bearing surface of the writer; and
    a reader disposed on the slider such that the writer is between the substrate and the reader;
    wherein write induced protrusion of the air bearing surface of the writer is moderated by stiffness of the substrate proximate the writer.

12. The apparatus of claim 11, wherein at least one of the at least two heaters is coupled in series with the write coil.

13. The apparatus of claim 11, wherein at least one of the at least two heaters is coupled in parallel with the write coil.

14. The apparatus of claim 11, wherein at least one of the at least two heaters is disposed between the write coils of the writer.

15. The apparatus of claim 11, wherein:
    a first heater is disposed within the writer; and
    a second heater is disposed proximate the reader.

16. The apparatus of claim 15, wherein:
    the first and second heaters are coupled in parallel; and
    the parallel-coupled first and second heaters are coupled in series with write coil.

17. The apparatus of claim 11, wherein:
    at least three heaters are coupled between the first and second bond pads;
    a first heater is disposed within the writer; and
    a second heater and a third heater are disposed proximate the reader.

18. The apparatus of claim 11, wherein a first heater is coupled in parallel with the write coil and a second heater is coupled in series with the parallel coupled write coil and first heater.

19. The apparatus of claim 11, further comprising an input coupler configured to receive light from a light source, wherein the reader is closer than the writer to a magnetic medium if the light source is turned off and the writer is closer than the reader to the magnetic medium when the light source is turned on.

20. The apparatus of claim 11, further comprising an input coupler configured to receive light from a light source, wherein the reader is closer than the writer to a magnetic medium if the light source is turned off or the light source is turned on at a current below a predetermined activation current and the writer is closer than the reader to the magnetic medium when the light source is turned on at a current at or above the predetermined activation current.

* * * * *